(12) United States Patent
Falconetti et al.

(10) Patent No.: US 9,554,365 B2
(45) Date of Patent: Jan. 24, 2017

(54) COMMUNICATION OF DATA USING INDEPENDENT DOWNLINK AND UPLINK CONNECTIONS

(75) Inventors: Laetitia Falconetti, Aachen (DE); Chrysostomos Koutsimanis, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 68 days.

(21) Appl. No.: 14/001,456

(22) PCT Filed: Feb. 23, 2011

(86) PCT No.: PCT/EP2011/052679
§ 371 (c)(1),
(2), (4) Date: Aug. 23, 2013

(87) PCT Pub. No.: WO2012/113448
PCT Pub. Date: Aug. 30, 2012

(65) Prior Publication Data
US 2013/0331115 A1 Dec. 12, 2013

(51) Int. Cl.
*H04W 72/04* (2009.01)
*H04W 72/08* (2009.01)
(Continued)

(52) U.S. Cl.
CPC ........ *H04W 72/0406* (2013.01); *H04L 5/0053* (2013.01); *H04W 72/0426* (2013.01);
(Continued)

(58) Field of Classification Search
None
See application file for complete search history.

(56) References Cited

U.S. PATENT DOCUMENTS 6,304,754 B1 * 10/2001 DeSantis ............... H04W 16/18
455/429
2010/0008294 A1 1/2010 Palanki et al.
(Continued)

FOREIGN PATENT DOCUMENTS

EP 2 291 053 A1 3/2011
WO 2010034528 A1 4/2010
(Continued)

OTHER PUBLICATIONS

NTT Docomo et al. "Inter-cell Radio Resource Management for Heterogeneous Network" vol. 3GPP TSG RAN WG1 Meeting #54, No. R1-083019, 2008, XP008136476, 20 pages.
(Continued)

*Primary Examiner* — Olumide T Ajibade Akonai
*Assistant Examiner* — Margaret G Mastrodonato
(74) *Attorney, Agent, or Firm* — Rothwell, Figg, Ernst & Manbeck, P.C.

(57) ABSTRACT

In communication of data between a first base station and a mobile terminal, a second base station may handle uplink transmissions from the mobile terminal. For this purpose, the first base station sends, to the second base station, a request to handle the uplink transmissions from the mobile terminal. The handling of the uplink transmissions to be performed by the second base station includes scheduling of the uplink transmissions so as to obtain uplink scheduling information. Via a backhaul link, the second base station transmits the uplink scheduling information to the first base station. The first base station includes the uplink scheduling information into downlink transmissions to the mobile terminal.

22 Claims, 7 Drawing Sheets

(51) Int. Cl.
    *H04W 72/12*     (2009.01)
    *H04W 24/02*     (2009.01)
    *H04L 5/00*     (2006.01)

(52) U.S. Cl.
    CPC ......... *H04W 72/085* (2013.01); *H04L 5/0091* (2013.01); *H04W 24/02* (2013.01); *H04W 72/048* (2013.01); *H04W 72/1289* (2013.01)

(56) References Cited

U.S. PATENT DOCUMENTS

| | | | |
|---|---|---|---|
| 2010/0105404 A1 | 4/2010 | Palanki et al. | |
| 2010/0238827 A1 | 9/2010 | Borran et al. | |
| 2010/0323749 A1* | 12/2010 | Lee et al. | 455/524 |
| 2011/0053585 A1* | 3/2011 | Otonari | 455/422.1 |
| 2013/0077506 A1* | 3/2013 | Hu | H04W 72/085 370/252 |

FOREIGN PATENT DOCUMENTS

| | | |
|---|---|---|
| WO | 2010083892 A1 | 7/2010 |
| WO | 2010087175 A1 | 8/2010 |

OTHER PUBLICATIONS

NTT Docomo et al. "Inter-cell Radio Resource Management for Heterogeneous Networks" vol. 3GPP TSG RAN WG1 Meeting #58bis, No. R1-094246, 2009, 8 pages.

Morimoto et al. "Investigation on Optimum Radio Link Connection Using Remote Radio Equipment in Heterogeneous Network for LTE-Advanced" 2009 IEEE 69th Vehicular Technology Conference, XP031474564, ISBN: 978-1-4244-2517-4, 5 pages.

Ericsson et al. "Aspects on Distributed RRUs with Shared Cell-ID for Heterogeneous Deployments" 3GPP TSG-RAN WG1 #64, R1-110649, 2011, 3rd Generation Partnership Project (3GPP), XP050490740, 11 pages.

Ericsson et al. "Considerations on non-CA based heterogeneous deployments" 3GPP TSG-RAN WG1 meeting #60 bis, R1-101752, 2010, 4 pages.

* cited by examiner

COMMUNICATION OF DATA USING INDEPENDENT DOWNLINK AND UPLINK CONNECTIONS

CROSS REFERENCE TO RELATED APPLICATION(S)

This application is a 35 U.S.C. §371 National Phase Entry Application from PCT/EP2011/052679, filed Feb. 23, 2011, designating the United States, the disclosure of which is incorporated herein in its entirety by reference.

TECHNICAL FIELD

The present invention relates to methods for communication of data using independent downlink (DL) and uplink (UL) connections to a mobile terminal, and to corresponding devices.

BACKGROUND

In mobile communication networks, such as 3GPP networks (3GPP: Third Generation Partnership Project) there is a continuing need for higher throughputs. In UL communication, i.e., in communication from a mobile terminal to the network, transmit power limitations in mobile terminals and constraints on the UL budget mean that such higher throughputs typically necessitate smaller cell sizes than is typically deployed for present cellular systems. For example, in heterogeneous networks, also referred to as HetNet, conventional base stations (BSs), referred to as Macro BSs, are complemented by further BSs, which are usually deployed closer to the end users, e.g., on street level. As compared to the Macro BSs, these further BSs typically transmit at a lower power. In the following, these further BSs will also be referred to as Pico BSs. The Pico BSs can use carrier frequencies from the same spectrum as the Macro BSs or may use carrier frequencies from another spectrum.

In current cellular networks, e.g., 3GPP Long Term Evolution (LTE), cell association is based on a Reference Signal Received Power (RSRP) measurement by the mobile terminal. That is to say, the respective RSRPs as measured for different BSs are used as a basis for selecting a serving BS of the mobile terminal, which then sends DL transmissions to the mobile terminal and receives UL transmissions from the mobile terminal. The RSRP depends on the transmit (Tx) power of the respective BS. In the case of a heterogeneous network deployment, there may be a large imbalance in the Tx power between a Macro BS and a Pico BS. Specifically, Macro BSs usually transmit at a high Tx power level, e.g., 46 dBm, whereas Pico BSs may use a much lower Tx power level, e.g., 30 dBm, or even less. Thus, the difference in Tx power between transmitted reference signals can be 16 dB or more. The RSRP is indicative of a DL channel quality between the BS and the mobile terminal. As compared to that, the UL channel quality between the mobile terminal and the BS depends on the signal damping, also referred to as pathloss, between the mobile terminal and the BS.

In conventional homogeneous networks, the BS that provides the highest RSRP is identical to the BS that yields the lowest average pathloss. However, this is not the case in heterogeneous networks. The imbalance in the Tx power among the different types of BSs may lead to a situation where a mobile terminal measures a higher RSRP from a Macro BS, although it is located closer to a Pico BS and its pathloss to the Pico BS is smaller than the pathloss to the Macro BS. In this case, it would be preferable for the mobile terminal to receive data from the BS with the highest RSRP, i.e., from the Macro BS, and to transmit data to the BS with the lowest pathloss, i.e., to the Pico BS.

Accordingly, in a heterogeneous network conventional RSRP-based cell association may result in suboptimal performance in the UL.

A suggested way to balance the performance between DL and UL in a heterogeneous network is to use independent DL and UL connections, i.e., to use one BS for the DL and another BS for the UL. Specifically the UL transmissions of mobile terminals located at a cell border of a Macro BS may then benefit from the improved UL channel quality to a Pico BS which is closer to the mobile terminal than the Macro BS.

Accordingly, there is a need for techniques which allow for efficiently implementing independent DL and UL connections to a mobile terminal.

SUMMARY

According to an embodiment of the invention, a method of communicating data between a first base station and a mobile terminal is provided. According to the method, the first base station sends, to a second base station, a request to handle uplink transmissions from the mobile terminal. The handling of the uplink transmissions to be performed by the second base station comprises scheduling of the uplink transmissions so as to obtain uplink scheduling information. The first base station receives the uplink scheduling information from the second base station. Further, the first base station sends downlink transmissions to the mobile terminal. The downlink transmissions include the downlink scheduling information received from the second base station.

According to a further embodiment of the invention, a method of assisting in communicating data between a first base station and a mobile terminal is provided. According to the method, a second base station receives, from the first base station, a request to handle uplink transmissions from the mobile terminal. Further, the second base station performs scheduling of the uplink transmissions from the mobile terminal so as to obtain uplink scheduling information. Further, the second base station sends the uplink scheduling information to the first base station so as to be included into downlink transmissions from the first base station to the mobile terminal.

According to a further embodiment of the invention, a base station is provided. The base station comprises a radio interface to send downlink transmissions to a mobile terminal and to receive uplink transmissions from the mobile terminal. Further, the base station comprises a backhaul interface to communicate with a further base station. Moreover, the base station comprises a processor to control operations of the base station. These controlled operations comprise:
  via the backhaul interface, the base station sending to the further base station a request to handle uplink transmissions from the mobile terminal, said handling of the uplink transmissions comprising scheduling of the uplink transmissions so as to obtain uplink scheduling information;
  via the backhaul interface, the base station receiving the uplink scheduling information from the second base station; and
  via the radio interface, the base station sending downlink transmissions to the mobile terminal, said downlink transmissions comprising the uplink scheduling information received from the further base station.

According to a further embodiment of the invention, a base station is provided. The base station comprises a radio interface to send downlink transmissions to a mobile terminal and to receive uplink transmissions from the mobile terminal. Further, the base station comprises a backhaul interface to communicate with a further base station. Moreover, the base station comprises a processor to control operations of the base station. These controlled operations comprise:

- via the backhaul interface, the base station receiving from the further base station a request to handle uplink transmissions from the mobile terminal;
- the base station performing scheduling of the uplink transmissions from the mobile terminal so as to obtain uplink scheduling information; and
- via the backhaul interface, the base station sending the uplink scheduling information to the further base station so as to be included into downlink transmissions from the further base station to the mobile terminal.

According to a further embodiment of the invention, a communication system is provided. The communication system comprises a first base station and a second base station. The communication system is configured to perform operations comprising:

- the first base station sending, to the second base station, a request to handle uplink transmissions from a mobile terminal;
- the second base station receiving the request to handle uplink transmissions from the mobile terminal;
- the second base station performing scheduling of the uplink transmissions from the mobile terminal so as to obtain uplink scheduling information;
- the second base station sending the uplink scheduling information to the first base station; the first base station receiving the uplink scheduling information; and
- the first base station sending downlink transmissions to the mobile terminal, said downlink transmissions including the uplink scheduling information received from the second base station.

According to further embodiments, other methods, devices, or computer program products including program code to be executed by a processor for implementing the methods may be provided.

DETAILED DESCRIPTION OF EMBODIMENTS

In the following, the invention will be explained in more detail by referring to exemplary embodiments and to the accompanying drawings. The illustrated embodiments relate to concepts for independent uplink communication from a mobile terminal. In the illustrated examples, it will be assumed that downlink and uplink communication is implemented according to 3GPP LTE. However, it is to be understood that the illustrated concepts may also be applied in other types of mobile communication networks.

Figure 1:
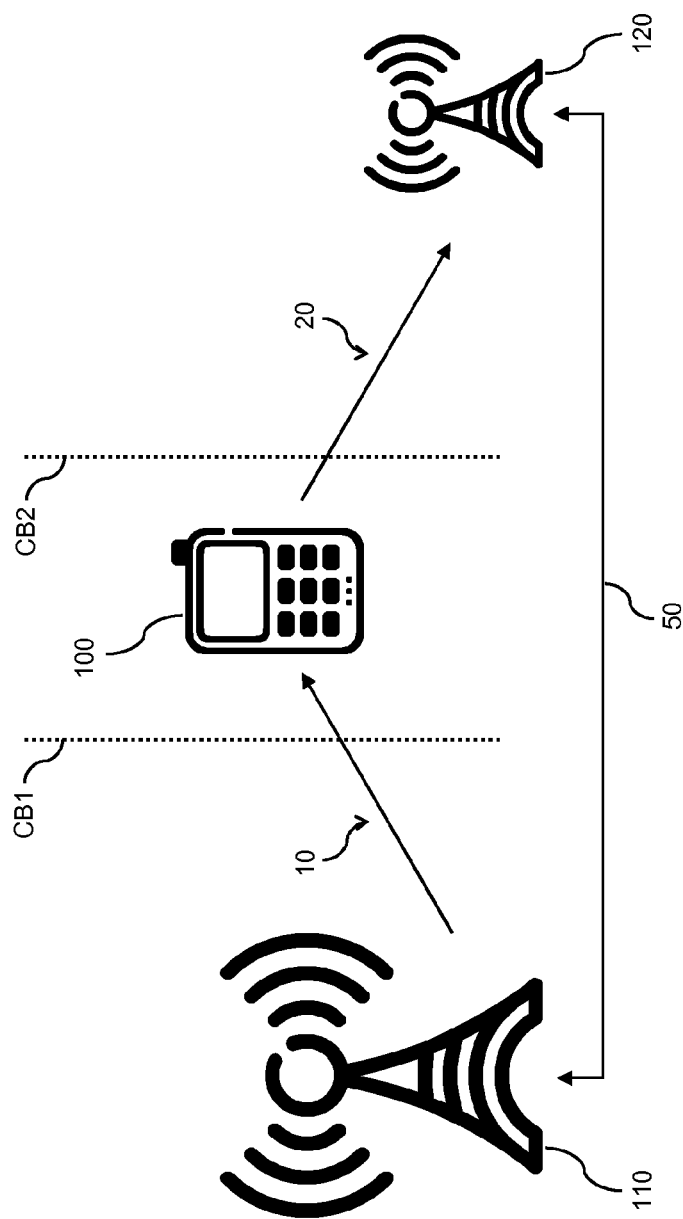
FIG. 1 schematically illustrates a mobile communication network environment in which concepts of data communication according to an embodiment of the invention can be applied.

FIG. 1 schematically illustrates a mobile communication network environment, i.e., infrastructure of a mobile communication network, represented by a first base station (BS) 110 and a second BS 120, and a mobile terminal 100 to be used in the mobile communication network. The mobile terminal 100 may be, e.g., a mobile phone, portable computer, or other type of user equipment (UE). In the following, the mobile terminal 100 will also be referred to as UE. As illustrated, the communication network supports an independent link mode using independent DL and UL connections to the UE 100. In the independent link mode the UE 100 receives DL transmissions 10 from the first BS 110 and the second BS 120 receives UL transmissions 20 from the UE 100. For implementing the independent link mode, the first BS 110 and the second BS 120 communicate via a backhaul link 50. However, the communication network also supports a conventional mode in which the UE 100 receives DL transmissions from one of the BSs 110, 120 and this BSs 110, 120 also receives the UL transmissions from the UE 100.

As further illustrated, the mobile communication network is based on a heterogeneous network deployment in which the first BS 110 corresponds to a Macro BS and the second BS 120 corresponds to a Pico BS. This means that the second BS 120 transmits at a lower Tx power than the first BS 110. In accordance with the illustrated 3GPP LTE scenario, the BSs 110, 120 may each correspond to an evolved Node B (eNB) and the DL and UL transmissions 10, 20 may be transmitted across the Uu radio interface. The backhaul link 50 may be established by directly connecting the BSs 110, 120, e.g., via the X2 interface, or by indirectly connecting the BSs 110, 120, e.g., via one or more intermediate nodes using several X2 and/or S1 interfaces. The backhaul link 50 that can be wire based, e.g., using optical fiber, twisted pair copper lines, and/or coaxial lines, or can be wireless, e.g., using microwave transmission, Wireless Local Area Network (WLAN), or LTE. In some scenarios, the backhaul link 50 may also be implemented by a combination of wire based transmission and wireless transmission, e.g., by using any combination of the above-mentioned examples of wire based and wireless technologies.

Whether the conventional mode or the independent link mode is used may be selected, e.g., on the basis of the pathloss from the UE 100 to the second BS 120. More specifically, the selection may be on the basis of the difference between the pathloss from the UE 100 to the second BS 120 and the pathloss from the UE 100 to the first BS 110. Concepts of selecting between the conventional mode and the independent link mode will now be further explained by referring to illustrative cell border lines CB1 and CB2 in FIG. 1.

The cell border line CB1 illustrates a cell border between the first and second BSs 110, 120 when assuming a selection mechanism on the basis of the pathloss. In this pathloss-based selection mechanism, the BS having the lowest pathloss would be selected for handling communications with the UE 100. The pathloss-based selection mechanism is favorable in view of UL performance. The cell border line CB2 illustrates a cell border between the first and second BSs 110, 120 when assuming a selection mechanism on the basis of received signal quality at the UE 100, e.g., on the basis of the RSRP. In this received-signal quality based selection mechanism, the BS offering the highest received signal quality at the UE would be selected for communicating with the UE 100. The received-signal quality based selection mechanism is favorable in view of DL performance.

In the illustrative scenario of FIG. 1, the UE 100 is located in a transition area between the cell border lines CB1 and CB2. This means that, the pathloss-based selection mechanism, which is favorable in view of UL performance, would select the second BS 120, whereas the received-signal quality based selection mechanism, which is favorable in view of DL performance, would select the first BS 110. In this situation, overall performance can be improved by selecting the independent link mode.

The pathloss PL from a UE to a BS may be estimated by the difference between the RSRP at the UE and the Tx power at the BS. In this case, it can be seen that the UE 100 being in the transition area between the first BS 110 and the second BS 120 means that the RSRP of the first BS 110, denoted by RSRP1, the RSRP of the second BS 120, denoted by RSRP2, the Tx power of the first BS 110, denoted by PTx1, and the Tx power of the second BS 120, denoted by PTx2, satisfy the relation:

$$RSRP1-RSRP2 \le PTx1-PTx2. \quad (1)$$

Relation (1) may therefore be used to identify whether a particular UE is located in the transition area between two BSs. The needed RSRPs can be obtained from measurement reports. The Tx powers can be obtained, e.g., from Operations and Maintenance data or by using exchanging messages with neighboring BSs.

Figure 2:
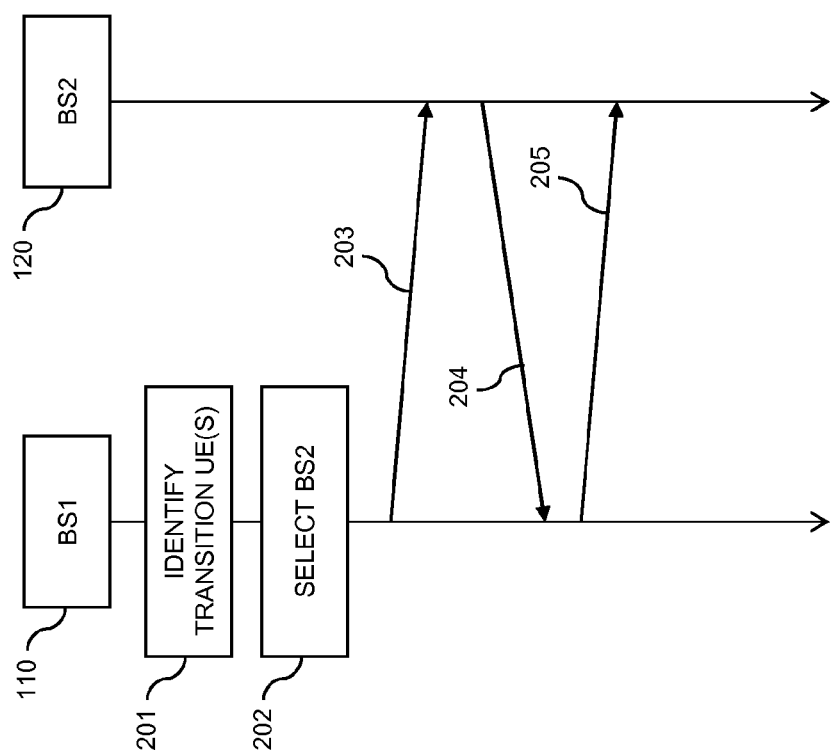
FIG. 2 shows a signaling diagram of a process for establishing independent DL and UL connections according to an embodiment of the invention.

FIG. 2 shows a signaling diagram for schematically illustrating a process for establishing the independent DL and UL connections to the UE. More specifically, FIG. 2 illustrates communication between the first BS 110 and the second BS 120. In the process of FIG. 2, it is assumed that the first BS 110 is the serving BS 110 of one or more UEs, i.e., controls communications with respect to these UEs. This selection may be based on a conventional selection mechanism, e.g., on the basis of a received signal quality at the UE such as represented by the RSRP.

At step 201, the first BS 110 identifies one or more transition UEs among the UEs served by the first BS 110. As explained above, the transition UEs are UEs for which the first BS 110 offers the highest received signal quality at the UE, but another BS provides a lower pathloss than the first BS 110. The transition UEs may be identified using relation (1). Further, the transition UEs may be identified by comparing results of a received-signal quality based selection mechanism, e.g., on the basis of the RSRP, to results of a pathloss-based selection mechanism. Accordingly, both types of selection may be applied, and if for a certain UE the received-signal quality based selection mechanism indicates that the first BS 110 should be selected, whereas the pathloss-based selection mechanism indicates that another BS should be selected, this UE may be identified as a transition UE. Here, it should be noted that if for a certain UE the received-signal quality based selection mechanism indicates that another BS than the first BS 110 should be selected, this UE may be identified as a candidate for a handover to the other BS. In some scenarios, also a transition UE may be identified as a candidate for a handover, e.g., if for a certain UE the received-signal quality based selection mechanism indicates that another BS than the first BS 110 should be selected, but this other BS is different from a BS indicated by the pathloss-based selection mechanism. For example, the pathloss-based selection mechanism may indicate a still further BS or may indicate the first BS 110.

Having identified at least one transition UE, e.g., the UE 100 as illustrated in FIG. 1, a BS for handling UL transmissions from the transition UE is selected at step 202. In the illustrated example, the second BS 120 is selected. The selection may be based on the pathloss. More specifically, the second BS 120 may be selected on the basis of a difference between the pathloss from the transition UE to the first BS 110 and the pathloss from the transition UE to the second BS 120. For example, the second BS 120 may be selected if it provides a lower pathloss from the transition UE than the first BS 110. If there are multiple BSs providing a lower pathloss from the transition UE than the first BS 110, the second BS 120 may be selected among these multiple BSs as the one providing the lowest pathloss from the transition UE. Further, in view of relation (1), the second BS 120 may also be selected on the basis of a difference between the Tx power of the first BS 110 and the Tx power of the second BS 120.

It should be noted that the selections of steps 201 and 202 may be combined using a single selection mechanism. For example, the pathloss-based selection mechanism of step 201 may be used to identify one or more transition UEs, and at the same time the BS for handling UL transmissions from the respective transition UE. In particular, the other BS as indicated by the pathloss-based selection mechanism may also be selected as the BS for handling UL transmissions from the respective transition UE.

The first BS 110 then sends a message 203 to the second BS 120. The message 203 includes a request to handle UL transmissions from one or more of the UEs which were identified as being in the transition area between the first BS 110 and the second BS 120. The request may include or be accompanied by additional information, e.g., information for identifying the UE or UEs to which the request pertains, information on reference signals used by the UE or UEs to which the request pertains, UL scheduling information of the UE or UEs to which the request pertains, information on characteristics of the UE or UEs to which the request pertains, and/or information on an expected load associated with requested handling of the UL transmissions. Using the received information, the second BS 120 may perform measurements on the UL transmissions from the identified UEs. For example, the second BS 120 may determine a timing advance offset needed to synchronize the UL transmissions from the identified UE or UEs with other UL transmissions from UEs already handled by the second BS 120.

The second BS 120 may reject the request, e.g., if capacity available at the second BS 120 is not sufficient for the requested handling of UL transmissions. Otherwise, the second BS 120 may accept the request. The second BS 120 may indicate the rejection or acceptance of the request by sending a message 204 to the first BS 110. The message 204 may also include information on the cell load or on the amount of resources that the second BS 120 is willing to provide for handling the UL transmissions. Further, the message 204 may include information about a timing advance offset needed to synchronize the UL transmissions of a UE to which the request of message 203 pertains with UL transmissions of other UEs already handled by the second BS 120.

If the message 204 indicates acceptance of the request, the first BS 110 may send a further message 205 to the second BS 120. The message 205 may confirm the setup of independent DL and UL connections and/or may include UE specific information to be used by the second BS 120 in handling the UL transmissions. For example, this UE specific information may include a reference signal (RS) of the UE or UEs from which UL transmissions are to be handled, e.g., demodulation RS and/or sounding RS, and/or a UE specific scrambling sequence of the UE or UEs from which UL transmissions are to be handled. In modifications of the above process, the UE specific information may also be included in the message 203.

In an embodiment, the second BS 120 measures on UL transmissions from a UE to which the request of message 203 pertains the timing advance offset needed for the UL transmissions from this UE to be synchronized with UL transmissions from other UEs already handled by the second BS 120. In message 204, the second BS 120 may then include this measured timing advance offset. On the basis of the received timing advance offset, the first BS 110 may decide to cancel the procedure by not sending the conformation message 205, e.g., because the received timing advance offset does not comply with its own timing advance offset.

In the above process, the received-signal quality based selection mechanism may be the basis of first selecting the serving BS. In particular, each UE may be associated with its serving BS using conventional RSRP-based cell association. Among its served UEs, each serving BS may then identify those which are in the transition area to another BS and set up the independent UL connection to the other BS. In this way, the use of independent DL and UL connections can be kept transparent to the UEs.

Figure 3:
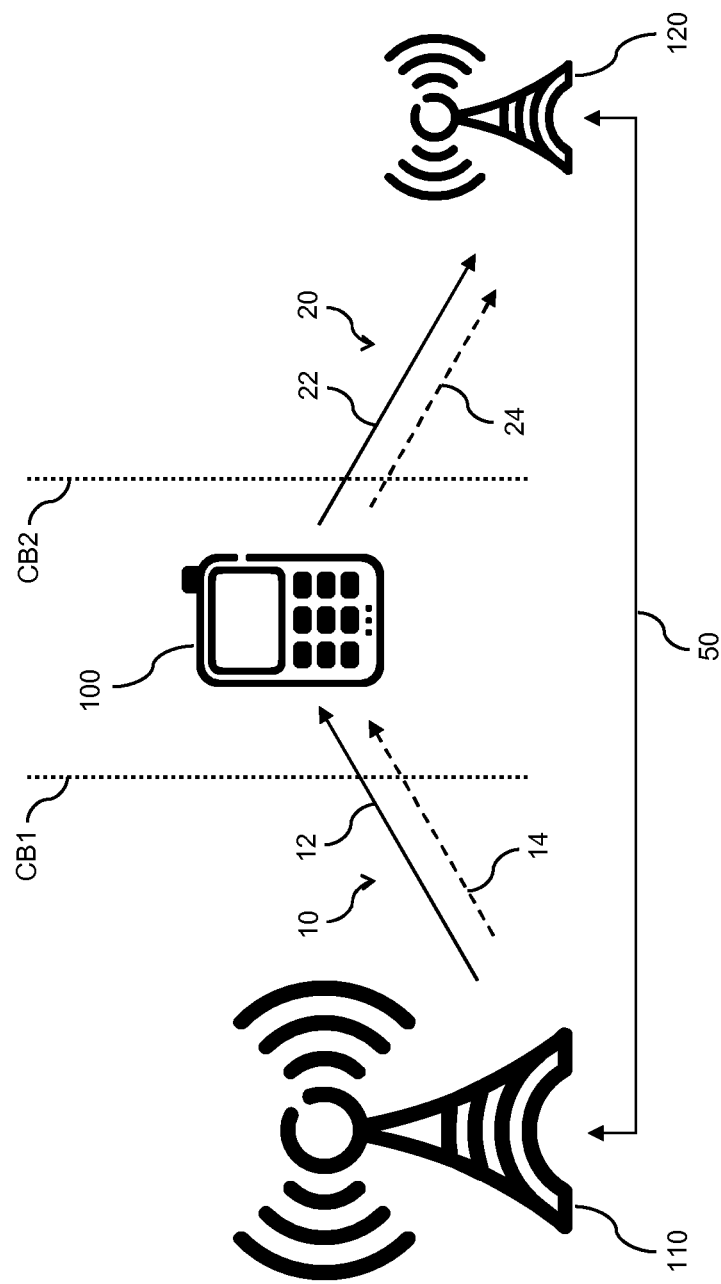
FIG. 3 schematically illustrates an implementation of independent DL and UL connections according to an embodiment of the invention.

FIG. 3 schematically illustrates the implementation of the independent DL and UL connections according to an embodiment of the invention. In FIG. 3, elements which correspond to those of FIGS. 1 and 2 have been designated by the same reference signs, and reference is made also to the corresponding description in connection with FIGS. 1 and 2. As illustrated, the first base station 110 sends DL transmissions 10 to the UE 100. The DL transmissions 10 include DL payload data 12 and DL control data 14. In accordance with the illustrated LTE scenario, the UL payload data 12 may be sent on a Physical Downlink Shared Channel (PDSCH) and the DL control data 14 may be sent on a Physical Downlink Control Channel (PDCCH). Further, the second base station 120 receives UL transmissions 20 from the UE 100. The UL transmissions 20 include UL payload data 22 and UL control data 24. In accordance with the illustrated LTE scenario, the UL payload data 22 may be sent on a Physical Uplink Shared Channel (PUSCH) and the UL control data 24 may be sent on a Physical Uplink Control Channel (PUCCH). The first BS 110 does not monitor the UL transmissions 20 from the UE 100. The second BS 120 in turn does not send any DL transmissions to the UE.

Accordingly, in the scenario of FIG. 3 it is the second BS 120 which receives not only the UL payload data 22 but also the UL control data 24, whereas the first BS 110 still transmits the DL payload data 12 and the DL control data 14. Using the backhaul link 50, the second BS 120 may then forward at least a part of the control data 24 and optionally also the payload data 22 to the first BS 110. In particular, the second BS 120 may forward control data which are used by the first BS 110 for controlling the DL transmissions 10 to the UE 100. Further, the second BS 120 may also generate control data from the received UL transmissions 20 and send the generated control data to the first BS 110 via the backhaul link. The control data transmitted from the second BS 120 to the first BS 110 may include measurement reports generated by the UE 100, e.g., as represented by a Precoding Matrix Indicator (PMI), a Channel Quality Indicator (CQI), a RSRP, a Received Signal Strength Indicator (RSSI), a Rank Indicator (RI), Channel State Information (CSI), and/or a mobility report. Further, control data transmitted from the second BS 120 to the first BS 110 may include messages for acknowledging receipt of a DL transmission 10 or for acknowledging receipt of an UL transmission 20, e.g., as represented by a positive acknowledgement (ACK) message or negative acknowledgement (NACK) message of the Hybrid Automatic Repeat Request (HARQ) protocol. Here, it is to be noted that an acknowledgement message for a DL transmission 10 would be generated by the UE 100, transmitted to the second BS 120 with the UL control data 24, and then forwarded from the second BS 120 to the first BS 110 via the backhaul link 50. As compared to that, an acknowledgement message for an UL transmission 20 would be generated by the second BS 120, transmitted to the first BS 110, and then forwarded by the first BS 110 to the UE 100 with the DL control data 14.

When handling the UL transmissions 20 from the UE 100, the second BS 120 is responsible for handling scheduling of the UL transmissions 20 from the UE 100. Scheduling of the UL transmissions 20 may in particular include allocation of time/frequency resources and/or Tx power adjustment for the UL transmissions 20. Further, the scheduling information may also include a timing advance offset to correct the start of a UL transmission 20. Scheduling of the DL transmissions 10 to the UE 100, which may in particular include allocation of time/frequency resources and Tx power adjustment for the DL transmissions 10, is turn accomplished by the first BS 110, but may take into account the control data received from the second BS 120, e.g., measurement reports or acknowledgement messages for DL transmissions. Scheduling of the UL transmissions 20 by the second BS 120 allows for efficiently implementing the independent DL and UL connections because the BS receiving the UL transmissions 20 also performs the scheduling for these UL transmissions 20. Scheduling processes as already provided for UL transmissions of UEs served by the second BS can be reused. However, the obtained UL scheduling information, e.g., time/frequency resource allocations, Tx power adjustment, and/or timing advance offset, is not transmitted directly from the second BS 120 to the UE 100, but rather sent to the first BS 110 so as to be forwarded to the UE 100 with the DL control data 14. For the UE 100, the independent implementation of the DL and UL connections can remain transparent, i.e., the UE 100 may operate in the same way as if it would communicate with the first BS 110 only.

Figure 4:
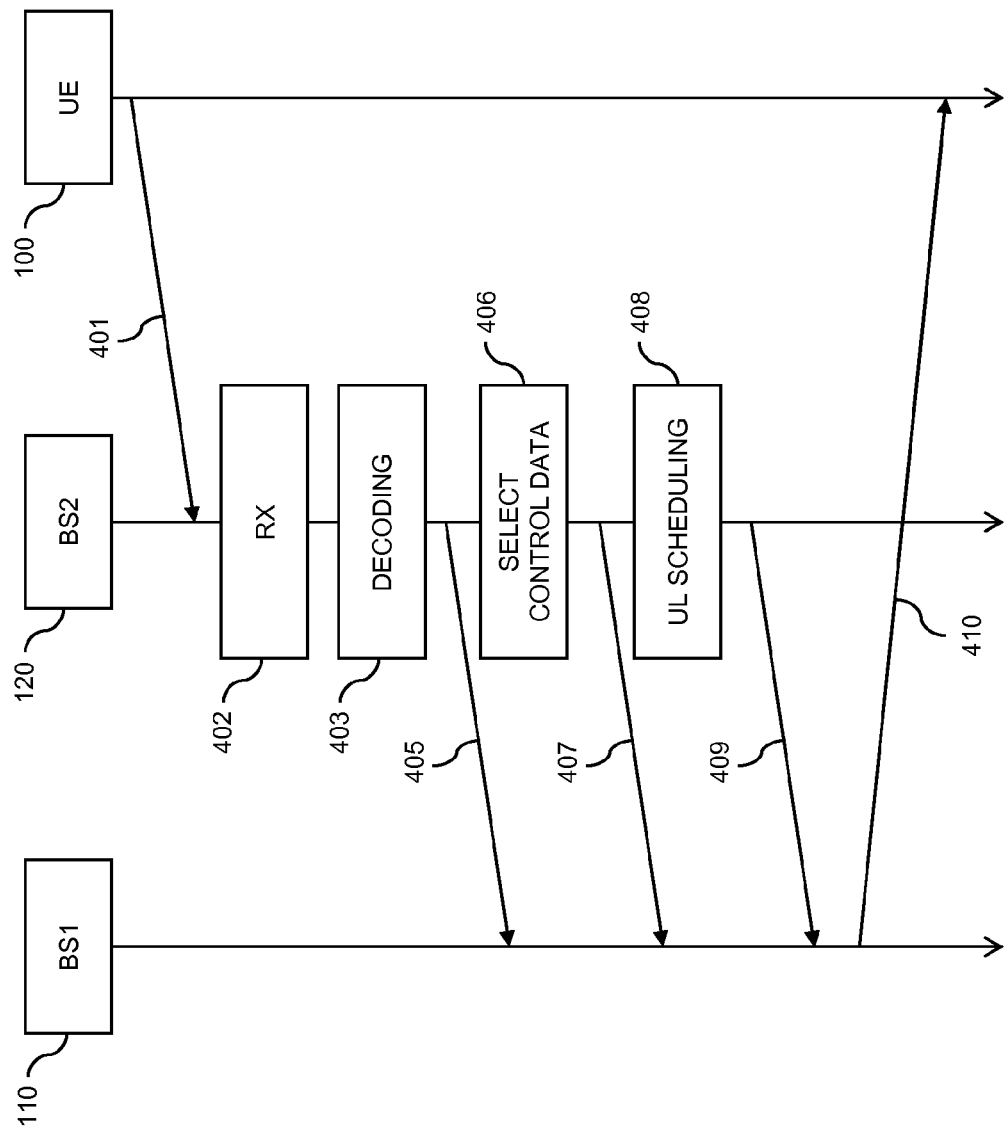
FIG. 4 shows a signaling diagram of a communication process while using independent DL and UL connections according to an embodiment of the invention.

FIG. 4 shows a signaling diagram of a communication process while using independent DL and UL connections, e.g., independent DL and UL connections as established using the process of FIG. 2 and implemented as explained in connection with FIG. 3.

In the illustrated process, the second BS 120 monitors UL transmissions from the UE 100. As illustrated, the second BS 120 receives a particular UL transmission 401 from the UE 100. Reception (Rx) processing is illustrated at step 402. The reception processing may include, e.g., demodulation and conversion to digital samples.

At step 403, the second BS 120 performs decoding of the received UL transmission 401. The decoding process may also include verifying integrity of reception, e.g., by performing a cyclic redundancy check (CRC). The decoding process may be based on a UE specific scrambling sequence used by the UE 100.

The second BS 120 then transmits a message 405 to the first BS 110. The message 405 may include control data generated by the second BS 120 in the decoding process, in particular acknowledgement messages. More specifically, if the integrity of reception was verified at step 403, the message 405 may include a HARQ protocol ACK message, and if the integrity of reception was not verified at step 403, the message 405 may include a HARQ protocol NACK message. The message 405 may also include decoded payload data. By sending the decoded payload data to the first BS 110, the first BS 110 may be the BS to supply the UL payload data to the network, which means that also from the network perspective the first BS 110 appears as the serving BS for the UE 100.

At step 406, the second BS 120 selects control data from the received UL transmission 401. More specifically, the second BS 120 may select acknowledgement messages for DL transmissions generated by the UE 100 and/or measurement reports generated by the UE 100. The second BS 120 then sends the selected control data with a message 407 to the first BS 110. The first BS 110 may use the received control data for controlling DL transmissions to the UE 100, e.g., for performing scheduling of DL transmissions.

At step 408, the second BS 120 performs scheduling of UL transmissions so as to obtain UL scheduling information. The UL scheduling information may in particular include allocation of time/frequency resources, Tx power adjustment, and/or timing advance offset for one or more future UL transmission by the UE 100. The scheduling of UL transmissions may be based on channel quality measurements on the UL connection from the UE 100 to the second BS 120. Since the second BS 120 itself monitors the UL transmissions from the UE 100, the channel quality measurements can be efficiently and precisely performed by the second BS 120 and be used directly as input parameters of the scheduling process. With message 409, the second BS 120 sends the UL scheduling information to the first BS 110.

The first BS 110 receives the message 409 with the UL scheduling information from the second BS 120 and includes the UL scheduling information into a DL transmission 410 of control data. The DL transmission may also include other control data to be forwarded to the UE 100, such as the acknowledgement message received with messages 405, or control data generated by the first BS 110, e.g., control data pertaining to DL transmissions.

It is to be understood that information as transmitted with messages 405, 407 and 409 may also be combined into a smaller number of messages. For example, only a single message including the information as transmitted with messages 405, 407 and 409 may be sent from the second BS 120 to the first BS 110. Further, the second BS 120 may perform scheduling of the UL transmissions at any suitable time, e.g., before the selection of step 406, before the decoding of step 403, or before the reception of step 402.

Figure 5:
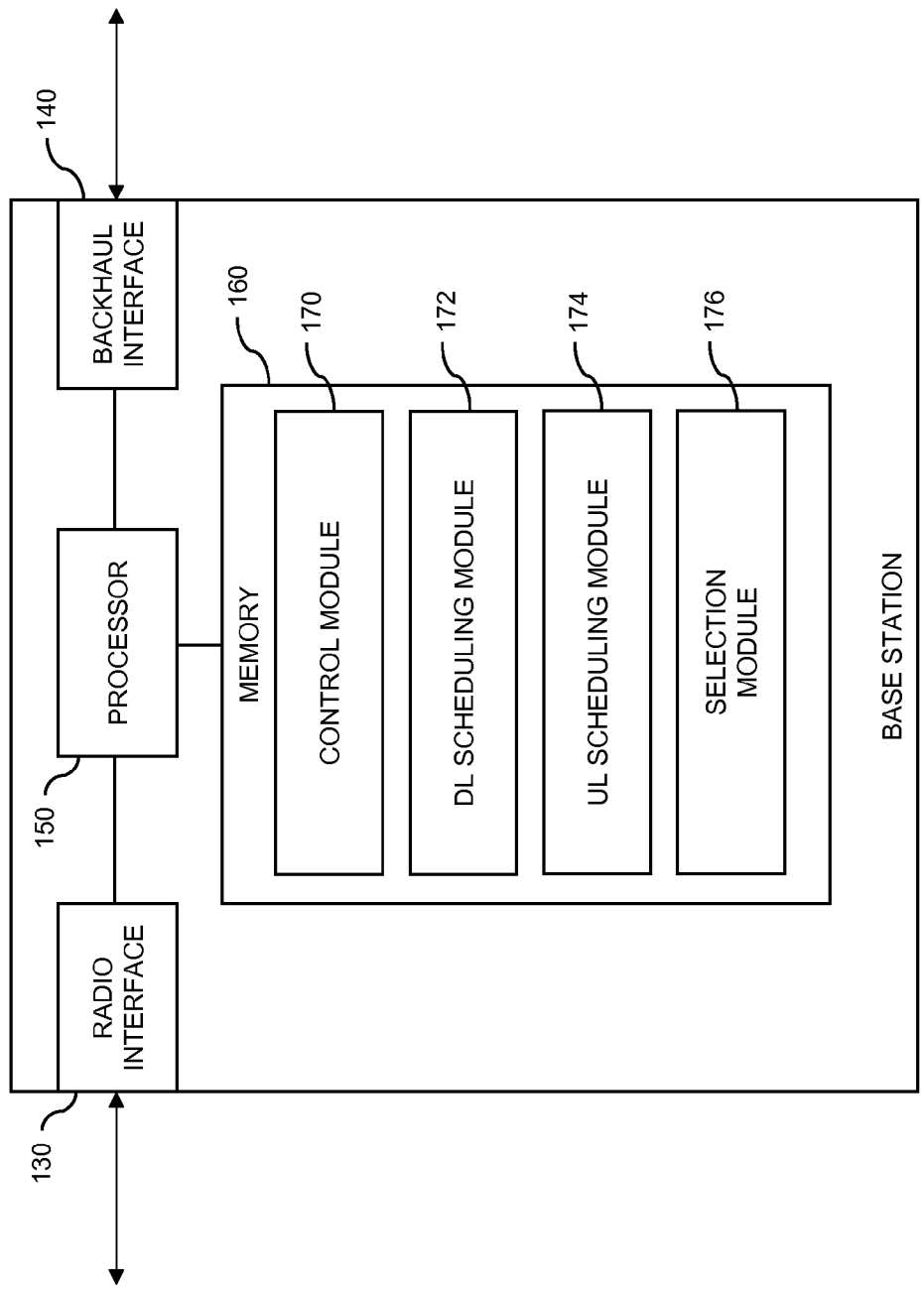
FIG. 5 schematically illustrates a base station according to an embodiment of the invention.

FIG. 5 schematically illustrates exemplary structures for implementing the above-described concepts in a BS, e.g., in the first BS 110 of FIGS. 1 to 4 or in the second BS 120 of FIGS. 1 to 4.

In the illustrated structure, the BS includes a radio interface 130 for transmitting DL transmissions and/or for receiving UL transmissions. It is to be understood that for implementing transmit functionalities the interface 130 will include one or more transmitters, and that for implementing receive functionalities the interface 130 will include one or more receivers. The interface 130 may correspond to the Uu radio interface according to 3GPP LTE. The interface 130 is capable of receiving and decoding UL transmissions not only from UEs served by the BS, but also from UEs served by another BS. Further, the BS includes a backhaul interface 140 for communicating with one or more other BSs, e.g., for implementing the backhaul link 50 as illustrated in FIGS. 1 and 3.

Further, the BS includes a processor 150 coupled to the interface 130 and a memory 160 coupled to the processor 150. The memory 160 may include a read-only memory (ROM), e.g. a flash ROM, a random-access memory (RAM), e.g., a Dynamic RAM (DRAM) or static RAM (SRAM), a mass storage, e.g., a hard disk or solid state disk, or the like. The memory 160 includes suitably configured program code to be executed by the processor 150 so as to implement the above-described functionalities of the BS. More specifically, the memory 160 may include control module 170 for controlling communication with respect to one or more UE, e.g., the UE 100 of FIGS. 1 to 4. The control module 170 may further be configured to control generating, sending and receiving of messages as described in connection with FIGS. 2 and 4. Moreover, the control module 170 may also be configured to control channel quality measurements performed by the BS, in particular channel quality measurements on UL connections from UEs which are not served by the BS. Further, the memory 160 may include a DL scheduling module 172 for scheduling DL transmissions of a UE and/or an UL scheduling module 174 for scheduling UL transmissions of a UE as explained in connection with FIGS. 3 and 4. In particular, the UL scheduling module 174 may be configured to accomplish UL scheduling not only for UEs served by the BS, but also for UEs served by another BS, when handling UL transmissions from the UEs served by the other BS. Further, the memory 160 may also include a selection module 176 for identifying or selecting transition UEs and/or for selecting other BSs for handling UL transmissions of a UE served by the BS, e.g., as explained in connection with FIGS. 1 and 2.

It is to be understood that the structure as illustrated in FIG. 5 is merely schematic and that the BS may actually include further components which, for the sake of clarity, have not been illustrated, e.g., further interfaces. Also, it is to be understood that the memory 160 may include further types of program code modules, which have not been illustrated. For example, the memory 160 may include program code modules for implementing typical functionalities of a BS. According to some embodiments, also a computer program product may be provided for implementing concepts according to embodiments of the invention, e.g., a computer-readable medium storing the program code and/or other data to be stored in the memory 160.

Figure 6:
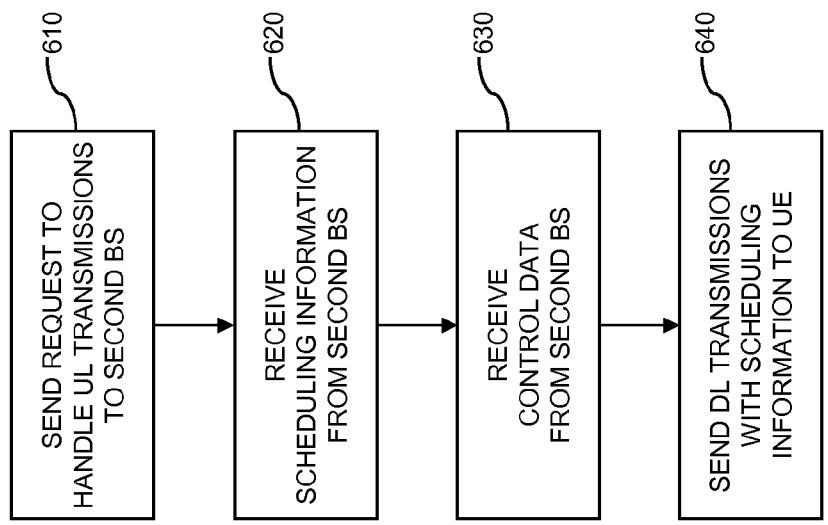
FIG. 6 shows a flowchart for illustrating a method according to an embodiment of the invention.

FIG. 6 shows a flowchart for schematically illustrating a method according to an embodiment of the invention. The method may be used in the first BS 110 of FIGS. 1 to 4 for implementing the above-described processes using independent DL and UL connections.

At step 610, a first BS sends a request to a second BS. By means of the request, the second BS is requested to handle UL transmissions from a UE. The first BS may be the serving BS of the UE, i.e., may control communications with respect to the UE. The first BS may be the first BS 110 of FIGS. 1 to 4, the second BS may be the second BS 120 of FIGS. 1 to 4, and the UE may be the UE 100 of FIGS. 1, 3 and 4. The request to handle UL communications from the UE may be sent via a backhaul link, e.g., the backhaul link 50 of FIGS. 1 and 3. The backhaul link may be established across respective backhaul interfaces of the first and second BSs, such as the backhaul interface 140 of FIG. 5. The requested handling of UL transmissions includes scheduling of the UL transmissions so as to obtain UL scheduling information, such as a time/frequency resource allocation and/or Tx power adjustment used for the UL transmissions. In addition, the requested handling of the UL transmissions typically also includes reception and decoding of the UL transmissions. Before sending the request, the first BS may select the second BS from a plurality of BSs, e.g., using selection mechanisms as described in connection with FIGS. 1 and 2.

Optionally, the first BS may receive a message indicating whether the request was accepted by the second BS, e.g., the message 204 of FIG. 2. Further, the first BS may transmit additional UE specific information to the second BS, which may be accomplished along with the request to handle UL transmissions or in one or more separate messages, e.g., the message 205 of FIG. 2. The additional UE specific information may be used by the second BS in the requested handling of UL transmissions, and include parameters such as UE specific reference signals.

At step 620, the UL scheduling information is received from the second BS. This may again be accomplished via the backhaul link. The UL scheduling information may be received in a dedicated message, e.g., the message 409 of FIG. 4, or may be received along with other information.

At step 630, control data may be received from the second BS, which may again be accomplished via the backhaul link, such as in messages 405 and 407 of FIG. 4. The control data may include measurement reports generated by the UE. Further, the control data may include messages for acknowledging receipt of a DL transmission or for acknowledging receipt of an UL transmission, e.g., HARQ protocol ACK messages or HARQ protocol NACK messages. The measurement reports and/or messages for acknowledging receipt of a DL transmission may be used by the first BS for performing scheduling of DL transmissions to the UE.

At step 640, the received UL scheduling information is included into a DL transmission to the UE, e.g., into a DL transmission of control data. This DL transmission may also include other control data, e.g., the messages for acknowledging receipt of a UL transmission received at step 630.

Figure 7:
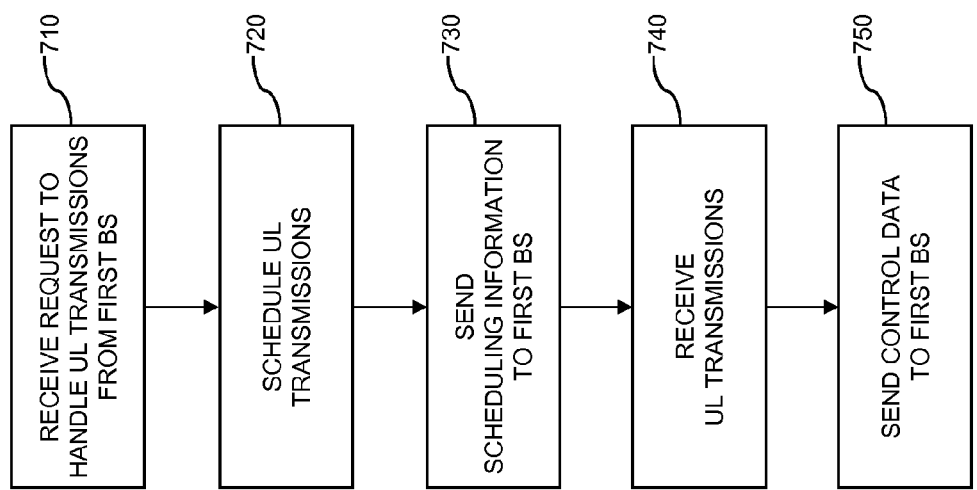
FIG. 7 shows a flowchart for illustrating a further method according an embodiment of the invention.

FIG. 7 shows a flowchart for schematically illustrating a method according to a further embodiment of the invention. The method may be used in the second BS 120 of FIGS. 1 to 4 for implementing the above-described processes using independent DL and UL connections.

At step 710, a request from a first BS is received by a second BS. By means of the request, the second BS is requested to handle UL transmissions from a UE. The first BS may be the serving BS of the UE, i.e., may control communications with respect to the UE. The first BS may be the first BS 110 of FIGS. 1 to 4, the second BS may be the second BS 120 of FIGS. 1 to 4, and the UE may be the UE 100 of FIGS. 1, 3 and 4. The request to handle UL communications from the UE may be sent via a backhaul link, e.g., the backhaul link 50 of FIGS. 1 and 3. The backhaul link may be established across respective backhaul interfaces of the first and second BSs, such as the backhaul interface 140 of FIG. 5. The requested handling of UL transmissions includes scheduling of the UL transmissions so as to obtain UL scheduling information, such as a time/frequency resource allocation and/or Tx power adjustment used for the UL transmissions. In addition, the requested handling of the UL transmissions includes reception and typically also decoding of the UL transmissions.

Optionally, the second BS may send a message indicating whether the request was accepted, e.g., the message 204 of FIG. 2. Further, the second BS may receive additional UE specific information from the first BS, which may be accomplished along with the request to handle UL transmissions or in one or more separate messages, e.g., the message 205 of FIG. 2. The additional UE specific information may be used by the second BS in the requested handling of UL transmissions, and include parameters such as UE specific reference signals.

At step 720, the second BS accomplishes scheduling of the UL transmissions from the UE so as to obtain the UL scheduling information. For this purpose, the second BS may also perform channel quality measurements on the UL connection from the UE.

At step 730, the second BS sends the UL scheduling information to the first BS. This may again be accomplished via the backhaul link. The UL scheduling information may be sent in a dedicated message, e.g., the message 409 of FIG. 4, or may be sent along with other information.

At step 740, the second BS receives the UL transmissions from the UE. Typically, this also includes decoding and integrity verification of the received UL transmissions. On the basis of the received UL transmissions, the second BS may generate control data to be sent to the first BS, e.g., messages for acknowledging receipt of the UL transmissions. Further, the second BS may also extract control data from the received UL transmissions, e.g., measurement reports from the UE.

At step 750, the second BS may transmit the generated or extracted control data to the first BS, which may again be accomplished via the backhaul link, such as in messages 405 and 407 of FIG. 4.

The methods of FIGS. 6 and 7 may be combined with each other in a communication system including the first BS and the second BS.

As can be seen, by using the above described concepts the overall performance of DL and UL connections in a heterogeneous network can be improved. Further, independent DL and UL connections can be implemented in a manner which is transparent to the UE and without excessive impact on existing technologies.

It is to be understood that the examples and embodiments as explained above are merely illustrative and susceptible to various modifications. For example, the concepts could be used in other types of mobile communication network. For example, the concepts may not only be used in heterogeneous network deployments using Macro and Pico BSs, but also in other network deployments in which imbalances between DL and UL connections may occur. Further, it is to be understood that the above concepts may be implemented by using correspondingly designed software in existing BSs, or by using dedicated hardware in the BSs.

The invention claimed is:

1. A method of communicating data between a first base station and a mobile terminal, the method comprising:
in response to determining that the mobile terminal is located in a transition area between two cell border lines, the first base station switching from a dual link mode to an independent link mode in which (i) in the dual link mode, the first base station provides downlink and uplink transmissions to the mobile terminal and (ii) in the independent link mode, the first base station provides downlink transmissions to the mobile terminal and a second base station provides uplink transmissions to the mobile terminal, the first base station selecting the second base station from a plurality of base stations, on the basis of a parameter which is indicative of a path loss for the uplink transmissions from the mobile terminal to the second base station;

the first base station sending, to the second base station, a request to handle uplink transmissions from the mobile terminal, said handling of the uplink transmissions comprising scheduling of the uplink transmissions to obtain uplink scheduling information;

the first base station receiving the uplink scheduling information from the second base station; and the first base station sending downlink transmissions to the mobile terminal, said downlink transmissions including the uplink scheduling information received from the second base station, wherein the scheduling information includes time-frequency resources, and wherein the mobile terminal is determined to be in the transition area based on $RSRP1-RSRP2 \leq PT_x1-PT_x2$, wherein the RSRP1 is the reference signal received power, RSRP, of the first base station, the RSRP2 is the RSRP of the second base station, $PT_x1$ is the transmission power of the first base station, $PT_x2$ is the transmission power of the second base station.

2. The method according to claim 1, wherein the first base station selects the second base station on the basis of a parameter which is indicative of a difference between the path loss for the uplink transmissions from the mobile terminal to the second base station and the path loss for uplink transmissions from the mobile terminal to the first base station.

3. The method according to claim 1, wherein the first base station further selects the second base station on the basis of a parameter which is indicative of a difference between a transmit power of the first base station and a transmit power of the second base station.

4. The method according to claim 1, comprising:
the first base station performing scheduling of the downlink transmissions to the mobile terminal.

5. The method according to claim 4, comprising:
the first base station receiving control data from the second base station; and
the first base station performing said scheduling of the downlink transmissions on the basis of the control data received from the second base station.

6. The method according to claim 1, comprising:
the second base station receiving, from the first base station, the request to handle uplink transmissions from the mobile terminal;
the second base station performing scheduling of the uplink transmissions from the mobile terminal to obtain the uplink scheduling information; and
the second base station sending the uplink scheduling information to the first base station to be included into the downlink transmissions from the first base station to the mobile terminal.

7. A base station comprising:
a radio interface configured to send downlink transmissions to a mobile terminal and to receive uplink transmissions from the mobile terminal;
a backhaul interface configured to communicate with a further base station; and
a processor configured to control operations of the base station,
wherein said operations of the base station comprise:
via the backhaul interface, the base station sending to the further base station a request to handle uplink transmissions from the mobile terminal, said handling of the uplink transmissions comprising scheduling of the uplink transmissions to obtain uplink scheduling information;
via the backhaul interface, the base station receiving the uplink scheduling information from the further base station; and
via the radio interface, the base station sending downlink transmissions to the mobile terminal, said downlink transmissions comprising the uplink scheduling information received from the further base station,
wherein the base station is configured to operate as the first base station of the method as defined in claim 1.

8. A base station comprising:
a radio interface configured to send downlink transmissions to a mobile terminal and to receive uplink transmissions from the mobile terminal;
a backhaul interface configured to communicate with a further base station; and
a processor configured to control operations of the base station,
wherein said operations of the base station comprise:
via the backhaul interface, the base station receiving from the further base station a request to handle uplink transmissions from the mobile terminal;
the base station performing scheduling of the uplink transmissions from the mobile terminal to obtain uplink scheduling information; and
via the backhaul interface, the base station sending the uplink scheduling information to the further base station to be included into downlink transmissions from the further base station to the mobile terminal,
wherein the base station is configured to operate as the second base station of the method as defined in claim 1.

9. A communication system comprising a first base station and a second base station;
wherein the communication system is configured to perform operations comprising:
the first base station sending, to the second base station, a request to handle uplink transmissions from a mobile terminal;
the second base station receiving the request to handle uplink transmissions from the mobile terminal;
the second base station performing scheduling of the uplink transmissions from the mobile terminal to obtain uplink scheduling information;
the second base station sending the uplink scheduling information to the first base station;
the first base station receiving the uplink scheduling information; and
the first base station sending downlink transmissions to the mobile terminal, said downlink transmissions including the uplink scheduling information received from the second base station,
wherein the communication system is configured to operate in accordance with a method according to claim 1.

10. The method of claim 1, wherein a path loss-based selection mechanism, in the mobile terminal, selects the second base station based on uplink performance and a received signal quality-based selection mechanism, in the mobile terminal, selects the first base station based on downlink performance.

11. The method according to claim 1, wherein the first base station does not monitor the uplink transmissions from the mobile terminal.

12. The method according to claim 11, wherein the second base station does not send downlink transmissions to the mobile terminal.

13. The method according to claim 1, wherein the first base station has a higher transmission power than the second base station.

14. The method according to claim 1, wherein the first base station is a macro base station and the second base station is a pico base station.

15. The method of claim 1, wherein the mobile terminal includes a path loss-based selection mechanism and a and a received signal quality-based selection mechanism, wherein the mobile terminal is further determined to be in the transition area in response to determining that the path loss-based selection mechanism selects a different second base station than the received signal quality-based selection mechanism.

16. A method of assisting in communicating data between a first base station and a mobile terminal, the method comprising:
a second base station receiving, from the first base station, a request to handle uplink transmissions from the mobile terminal, the first base station selecting the second base station from a plurality of base stations on the basis of a parameter which is indicative of a path loss for the uplink transmissions from the mobile terminal to the second base station;
the second base station performing scheduling of the uplink transmissions from the mobile terminal to obtain uplink scheduling information; and
the second base station sending the uplink scheduling information to the first base station so as to be included into downlink transmissions from the first base station to the mobile terminal, wherein
the scheduling information includes time-frequency resources,
wherein in response to determining that the mobile terminal is located in a transition area between two cell border lines, the mobile terminal is switched from a dual link mode to an independent link mode in which (i) in the dual link mode, the first base station provides downlink and uplink transmissions to the mobile terminal and (ii) in the independent link mode, the first base station provides downlink transmissions to the mobile terminal and a second base station provides uplink transmissions to the mobile terminal, and
wherein the mobile terminal is determined to be in the transition area based on $RSRP1-RSRP2 \leq PT_x1-PT_x2$, wherein the RSRP1 is the reference signal received power, RSRP, of the first base station, the RSRP2 is the RSRP of the second base station, $PT_x1$ is the transmission power of the first base station, $PT_x2$ is the transmission power of the second base station.

17. The method according to claim 6, comprising:
the second base station generating control data on the basis of the uplink transmissions received from the mobile terminal; and
the second base station sending the control data to the first base station.

18. The method according to claim 17, wherein the control data includes measurement reports generated by the mobile terminal.

19. The method according to claim 17, wherein the control data includes one or more messages for acknowledging receipt of a downlink transmission or for acknowledging receipt of an uplink transmission.

20. A base station, comprising:
a radio interface configured to send downlink transmissions to a mobile terminal and to receive uplink transmissions from the mobile terminal;
a backhaul interface configured to communicate with a further base station; and
a processor configured to control operations of the base station,
wherein said operations of the base station comprise:
via the processor, in response to determining that the mobile terminal is located in a transition area between two cell border lines, the base station switching from a dual link mode to an independent link mode in which (i) in the dual link mode, the base station provides downlink and uplink transmissions to the mobile terminal and (ii) in the independent link mode, the base station provides downlink transmissions to the mobile terminal and the further base station provides uplink transmissions to the mobile terminal,
via the processor, selecting the further base station from a plurality of base stations on the basis of a parameter which is indicative of a path loss for the uplink transmissions from the mobile terminal to the further base station
via the backhaul interface, the base station sending to the further base station a request to handle uplink transmissions from the mobile terminal, said handling of the uplink transmissions comprising scheduling of the uplink transmissions to obtain uplink scheduling information;
via the backhaul interface, the base station receiving the uplink scheduling information from the second base station; and
via the radio interface, the base station sending downlink transmissions to the mobile terminal, said downlink transmissions comprising the uplink scheduling information received from the further base station,
wherein the scheduling information includes time-frequency resources, and
wherein the mobile terminal is determined to be in the transition area based on $RSRP1-RSRP2 \leq PT_x1-PT_x2$, wherein the RSRP1 is the reference signal received power, RSRP, of the first base station, the RSRP2 is the RSRP of the second base station, $PT_x1$ is the transmission power of the first base station, $PT_x2$ transmission power of the second base station.

21. A base station, comprising:
a radio interface configured to send downlink transmissions to a mobile terminal and to receive uplink transmissions from the mobile terminal;
a backhaul interface configured to communicate with a further base station; and
a processor configured to control operations of the base station,
wherein said operations of the base station comprise:
via the backhaul interface, the base station receiving from the further base station a request to handle uplink transmissions from the mobile terminal, the further base station selected from a plurality of base stations on the basis of a parameter which is indicative of a path loss for the uplink transmissions from the mobile terminal to the further base station;

the base station performing scheduling of the uplink transmissions from the mobile terminal to obtain uplink scheduling information; and via the backhaul interface, the base station sending the uplink scheduling information to the further base station to be included into downlink transmissions from the further base station to the mobile terminal, wherein the scheduling information includes time-frequency resources wherein in response to determining that the mobile terminal is located in a transition area between two cell border lines, the mobile terminal is switched from a dual link mode to an independent link mode in which (i) in the dual link mode, the base station provides downlink and uplink transmissions to the mobile terminal and (ii) in the independent link mode, the base station provides downlink transmissions to the mobile terminal and the further base station provides uplink transmissions to the mobile terminal, and wherein the mobile terminal is determined to be in the transition area based on $RSRP1-RSRP2 \leq PT_x1-PT_x2$, wherein the RSRP1 is the reference signal received power, RSRP, of the first base station, the RSRP2 is the RSRP of the second base station, $PT_x1$ is the transmission power of the first base station, $PT_x2$ the transmission power of the second base station.

22. A communication system comprising a first base station and a second base station;

wherein the communication system is configured to perform operations comprising:

in response to determining that the mobile terminal is located in a transition area between two cell border lines, the first base station switching from a dual link mode to an independent link mode in which (i) in the dual link mode, the first base station provides downlink and uplink transmissions to the mobile terminal and (ii) in the independent link mode, the first base station provides downlink transmissions to the mobile terminal and a second base station provides uplink transmissions to the mobile terminal;

the first base station selecting the second base station from a plurality of base stations on the basis of a parameter which is indicative of a path loss for the uplink transmissions from the mobile terminal to the second base station;

the first base station sending, to the second base station, a request to handle uplink transmissions from the mobile terminal;

the second base station receiving the request to handle uplink transmissions from the mobile terminal;

the second base station performing scheduling of the uplink transmissions from the mobile terminal to obtain uplink scheduling information;

the second base station sending the uplink scheduling information to the first base station;

the first base station receiving the uplink scheduling information; and the first base station sending downlink transmissions to the mobile terminal, said downlink transmissions including the uplink scheduling information received from the second base station, wherein the scheduling information includes time-frequency resources, and wherein the mobile terminal is determined to be in the transition area based on $RSRP1-RSRP2 \leq PT_x1-PT_x2$, wherein the RSRP1 is the reference signal received power, RSRP, of the first base station, the RSRP2 is the RSRP of the second base station, $PT_x1$ is the transmission power of the first base station, $PT_x2$ is the transmission power of the second base station.

\* \* \* \* \*